(12) United States Patent
Niederreiter

(10) Patent No.: US 6,317,340 B1
(45) Date of Patent: Nov. 13, 2001

(54) CIRCUIT CONFIGURATION FOR DRIVING A PULSE WIDTH MODULATOR IN A SWITCHED MODE POWER SUPPLY

(75) Inventor: Hans Niederreiter, Mühldorf (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/663,571

(22) Filed: Sep. 15, 2000

Related U.S. Application Data

(63) Continuation of application No. PCT/DE99/00463, filed on Feb. 19, 1999.

(30) Foreign Application Priority Data

Mar. 17, 1998 (DE) .............................................. 198 11 605

(51) Int. Cl.$^7$ .................................................... H03K 7/08
(52) U.S. Cl. .......................................... 363/41; 363/21.01
(58) Field of Search ................................... 363/20, 21.01, 363/40, 41

(56) References Cited

U.S. PATENT DOCUMENTS

| | | |
|---|---|---|
| 4,007,361 | 2/1977 | Martin . |
| 4,238,695 | 12/1980 | Hock . |
| 4,272,690 | 6/1981 | Riney et al. . |
| 4,480,299 * | 10/1984 | Muto et al. ............................ 363/41 |
| 4,532,435 | 7/1985 | Wood . |
| 4,626,979 * | 12/1986 | JaQuay ................................... 363/41 |
| 5,113,158 | 5/1992 | Tsuji et al. . |
| 5,347,442 * | 9/1994 | Henmi et al. .......................... 363/41 |
| 5,526,252 * | 6/1996 | Erdman .................................. 363/41 |
| 5,594,631 | 1/1997 | Katoozi et al. . |
| 6,021,052 * | 2/2000 | Unger et al. ........................... 363/26 |

* cited by examiner

*Primary Examiner*—Adolf Deneke Berhane
(74) *Attorney, Agent, or Firm*—Herbert L. Lerner; Laurence A. Greenberg; Werner H. Stemer

(57) ABSTRACT

A circuit configuration for driving a pulse width modulator in a switched mode power supply includes a difference formation stage having a first input terminal for receiving a control signal, a second input terminal for receiving a reference signal, and an output terminal for providing a drive signal. The difference formation stage forms a difference signal from the control signal and the reference signal, and amplifies the difference signal by a gain factor dependent on the drive signal and/or control signal. The difference formation stage includes a multiplier and a feedback path. The multiplier includes a multiplier output connected to the output terminal, a first multiplier input terminal for receiving the amplified difference signal, and a second multiplier input terminal. The feedback path has an output connected to the second multiplier input terminal and includes an amplifier having a gain range extending between a top limit and at a bottom limit. The amplifier produces, based on the drive signal, a first constant output signal if the drive signal has a value below a first limit value, and a second constant output signal if the drive signal has a value above a second limit value.

7 Claims, 3 Drawing Sheets

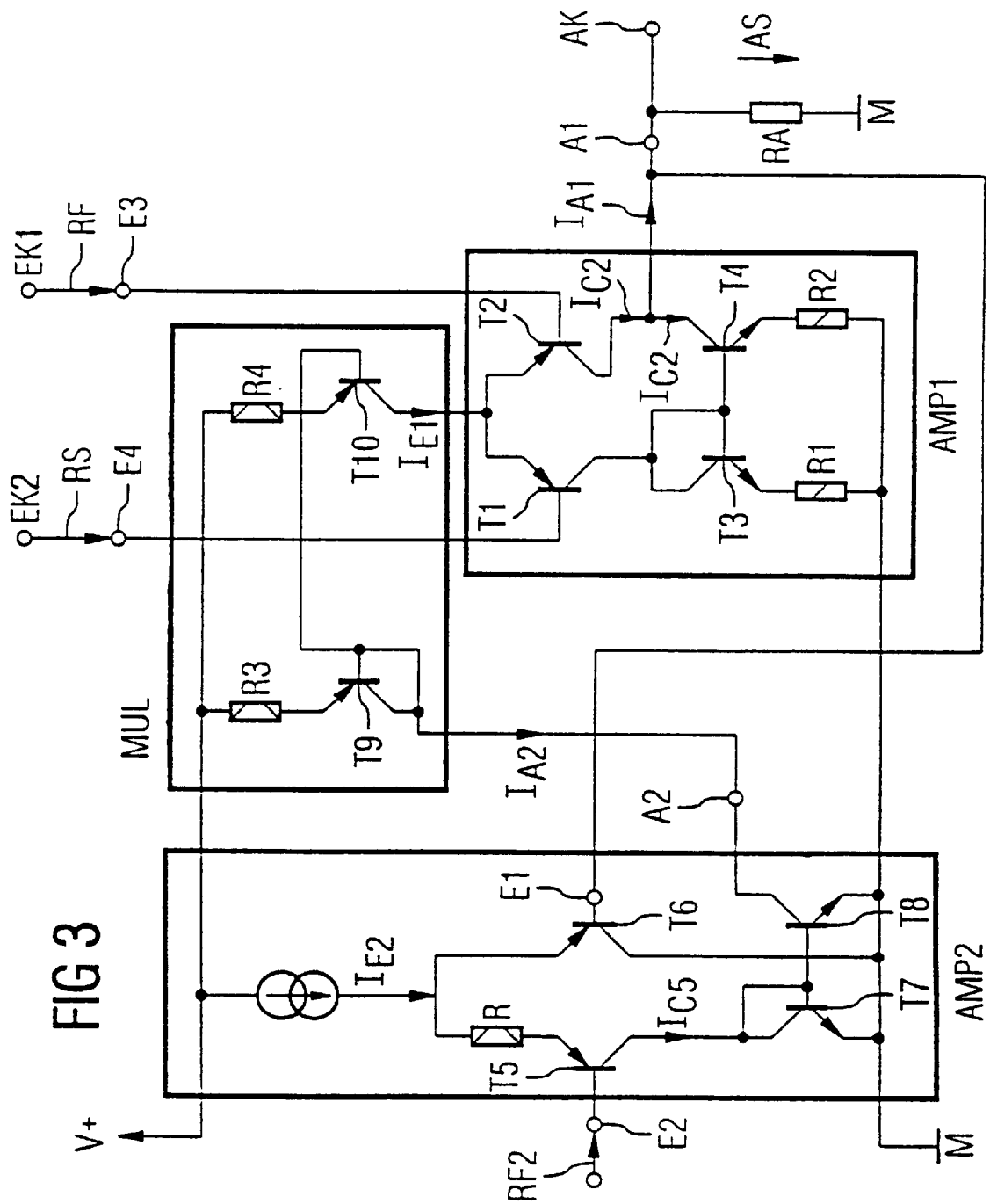

CIRCUIT CONFIGURATION FOR DRIVING A PULSE WIDTH MODULATOR IN A SWITCHED MODE POWER SUPPLY

CROSS-REFERENCE TO RELATED APPLICATION

This application is a continuation of copending International Application No. PCT/DE99/00463, filed Feb. 19, 1999, which designated the United States.

Background of the Invention

Field of the Invention

The present invention relates to a circuit configuration for driving a pulse width modulator in a switched mode power supply having a difference formation stage for forming a difference signal from a control signal, which can be supplied to a first input terminal, and a reference signal, which can be supplied to a second input terminal, and for producing a drive signal, which can be tapped off at an output terminal.

A pulse width modulator in a switched mode power supply produces drive pulses for a semiconductor power switch connected in series with the primary coil of a transformer. The frequency and duration of the drive pulses are determined by the power which is consumed by the primary coil, and hence by the switched mode power supply, and which, in turn, is output to a variable load connected to the secondary side of the transformer. During operation, the voltage drop across the load is intended to be kept constant as independently of the load as possible. This requires a reduction in the power consumption, and hence in the frequency and/or duration of the drive pulses, as the load is reduced, and an increase in the power consumption, and hence in the frequency and/or duration of the drive pulses, as the load is increased.

The output signal delivered to the pulse width modulator from the difference formation stage is used to set the duration and/or frequency of the drive pulses delivered by the pulse width modulator. In the case of switched mode power supplies having a fixed clock, the drive pulses in the pulse width modulator are generated through the use of a sawtooth generator, for example, the drive pulses starting and ending with rising edges of the generated sawtooth signal when the amplitude of the sawtooth signal exceeds the amplitude of the output signal delivered by the difference formation stage.

Output voltage fluctuations caused by load changes are returned by the control signal, which is dependent on the output voltage, to the difference formation stage, in which the control signal is compared with the reference signal and the drive signal is readjusted until the desired output voltage is established or a minimum possible difference is established between the control signal and the reference signal.

In the simplest case in known switched mode power supplies, the difference formation stage, acting as a controller, includes a differential amplifier for forming a difference signal from the control signal and the reference signal, with the difference signal subsequently being amplified by a constant gain factor. As a result of additional circuit measures, the differential amplifier, which has its own proportional control response, can be used to form a controller having an integral or a proportional/integral control response.

Irrespective of whether the difference formation stage is in the form of a proportional controller, an integral controller or a proportional/integral controller, the known switched mode power supplies have stability problems if the load which is to be driven, and hence the power consumption, is very small, as is the case for hi-fi or television equipment in standby mode, for example. In theory, in this case, short turn-on pulses at relatively long time intervals would be sufficient for the power consumption, in order to keep the voltage across the small load constant. On the other hand, the pauses between individual drive pulses must not exceed 50 μs, or the frequency of the drive pulses must not fall below 20 kHz, since this would cause the switched mode power supply to hum audibly. When the drive pulses have a preset frequency of higher than or equal to 20 kHz, the drive pulses for very small loads are indeed so short that the semiconductor power switch, which is usually in the form of a power FET, is no longer on, but rather changes to the active range. In the active range, small changes over the duration of the drive pulses cause large changes in the drain voltage of the power FET, and hence large changes in the load current flowing through the power FET and in the power consumed by the switched mode power supply. This results in instabilities in the readjustment of the drive signal generated by the difference formation stage. Limit cycling results, i.e. the power FET, as a result of too small a drive signal, is not turned on at all for a time and is then turned on fully again for a number of correspondingly longer drive pulses; the switched mode power supply is in burst mode. This results in undesirable acoustically audible noises from the switched mode power supply.

To date, this problem has been solved either in a complex and expensive manner by acoustic damping of the winding parts or by provision of a minimum load, which necessitates a power consumption at which the switched mode power supply does not change to burst mode. U.S. Pat. No. 4,007,361 discloses a prior art circuit configuration. This circuit configuration includes a difference formation stage for forming a difference signal from a control signal and a reference signal and for producing a drive signal, which can be tapped off at an output terminal, by amplifying the difference signal by a gain factor which is dependent on the drive signal and the control signal. The output of the difference formation stage has a multiplier to which the amplified difference signal and the drive signal fed back via a feedback network are supplied as input signals. Furthermore, U.S. Pat. No. 5,594,631 describes a circuit configuration for driving a pulse width modulator, the circuit configuration having a difference formation stage to which a control signal and a reference signal are supplied. The difference formation stage produces the difference signal between the control signal and the reference signal and supplies the difference signal to an amplifier whose gain is controlled on the basis of the control signal.

SUMMARY OF THE INVENTION

It is accordingly an object of the invention to provide a circuit configuration for driving a pulse width modulator in a switched mode power supply which overcomes the above-mentioned disadvantages of the heretofore-known configurations of this general type and which enables a stable operation of the switched mode power supply even with very small loads, such as in a standby mode, without annoying acoustically audible noises being produced by the switched mode power supply.

With the foregoing and other objects in view there is provided, in accordance with the invention, a circuit configuration for driving a pulse width modulator in a switched mode power supply, including:

a difference formation stage having a first input terminal for receiving a control signal, a second input terminal for receiving a reference signal, and an output terminal for providing a drive signal;

the difference formation stage forming a difference signal from the control signal and the reference signal, and amplifying the difference signal by a gain factor dependent on at least one of the drive signal and the control signal for providing an amplified difference signal;

the difference formation stage including a multiplier and a feedback path;

the multiplier including a multiplier output connected to the output terminal, a first multiplier input terminal for receiving the amplified difference signal, and a second multiplier input terminal;

the feedback path having an output connected to the second multiplier input terminal and including an amplifier having a gain range extending between a top limit and at a bottom limit; and the amplifier producing, based on the drive signal fed back into the feedback path via the multiplier output, a first constant output signal if the drive signal has a value below a first limit value, and the amplifier producing a second constant output signal if the drive signal has a value above a second limit value.

In accordance with another feature of the invention, the difference formation stage includes a differentiator connected upstream of the first multiplier input terminal for forming the difference signal, the differentiator has differentiator inputs connected to the first and second input terminals, and the difference formation stage further includes a further amplifier connected downstream of the differentiator.

In accordance with yet another feature of the invention, the differentiator and the further amplifier together form a differential amplifier.

In accordance with another feature of the invention, the differential amplifier is a first differential amplifier receiving an input current; the amplifier in the feedback path is configured as a second differential amplifier having a first amplifier input terminal for receiving the drive signal, a second amplifier input terminal for receiving a further reference signal, and an amplifier output terminal for supplying an output current dependent on the drive signal and on the further reference signal; and the difference formation stage further includes a current mirror configuration controlling the input current of the first differential amplifier in dependence of the output current from the second differential amplifier.

In accordance with another feature of the invention, the amplifier in the feedback path is configured as a linearly operating amplifier producing, for values of the drive signal above the first limit value and below the second limit value, an output signal rising linearly with an increasing value of the drive signal.

With the objects of the invention in view there is also provided, a circuit configuration for driving a pulse width modulator in a switched mode power supply, including:

a difference formation stage having a first input terminal for receiving a control signal, a second input terminal for receiving a reference signal, and an output terminal for providing a drive signal;

the difference formation stage forming a difference signal from the control signal and the reference signal, and amplifying the difference signal by a gain factor dependent on at least one of the drive signal and the control signal;

the difference formation stage including a first controlled current source and a second controlled current source, the second controlled current source including an input terminal and an output terminal;

the second controlled current source supplying at the output terminal a second output current dependent on the drive signal applied to the input terminal of the second controlled current source, the second controlled current source respectively delivering one of a first and a second constant value of the second output current if the drive signal has one of a value below a first limit value and a value above a second limit value; and the first controlled current source being connected to the output terminal of the second controlled current source, the first controlled current source having a first input terminal for receiving the reference signal and a second input terminal for receiving the control signal, the first controlled current source delivering, to an output terminal thereof, a first output current corresponding to the drive signal and dependent on the difference signal and further dependent on the second output current.

In accordance with another feature of the invention, the difference formation stage includes a current mirror configuration connected between the first and the second controlled current sources.

According to the invention, the gain factor k, with which the difference signal from the difference formation stage is amplified, is dependent on the drive signal.

This means that stable operation of the switched mode power supply is also possible when the power FET is in the active range. The power FET's gain, which is very high in the active range and becomes noticeable as a result of large changes in the power consumption for small changes in the duration of the drive pulses, is compensated for by a reduction in the gain in the difference formation stage, which serves as a controller. The drive signal which is delivered by the difference formation stage and whose amplitude governs the duration of the drive pulses produced by the pulse width modulator serves as a measure of the reduction in the gain factor k in the difference formation stage. In the case of a proportional control response from the difference formation stage, it is also possible for the control signal to be used as a measure of the reduction in the gain factor k in the difference formation stage.

In accordance with a first embodiment of the invention, provision is made for the difference formation stage to have a multiplier, whose output is connected to the output terminal, having a first input terminal, to which an amplified difference signal can be supplied, and having a second input terminal, to which an output terminal of a feedback path for feeding back the output signal is connected.

The amplified difference signal is preferably formed by a differentiator, whose input is connected to the input terminals of the difference formation stage, and a first amplifier connected downstream of the differentiator.

The feedback path has a second amplifier with a gain range which is limited at the top and bottom. The second amplifier, which preferably operates on a linear basis, delivers a constant output value for as long as the fed back drive signal is below a first limit value. For drive signals above this first limit value, the output signal from the second amplifier rises linearly until the output signal reaches a second limit value, after which the output signal remains constant. The output signal delivered by the second amplifier is used, via the multiplier, to weight the constant gain factor of the differential amplifier. The gain factor k of the difference formation stage thus results from multiplication of the constant gain factor of the first amplifier by the drive signal-dependent gain factor of the second amplifier, the gain factor k decreasing when the drive signal falls below the second limit value and when the duration of the drive pulses dependent on the drive signal falls below a particular minimum duration.

Preferably, the differentiator and the first amplifier are configured jointly as a first differential amplifier.

In one embodiment of the invention, the second amplifier, which is provided in the feedback path, is in the form of a second differential amplifier having a first input terminal, to which a second reference voltage which limits the linear gain range can be applied, and having a second input terminal, to which the fed back drive signal can be applied. In addition, this configuration is provided with a current mirror configuration which controls an input current flowing in the first differential amplifier on the basis of a current flowing in a path of the second differential amplifier. In this embodiment, the gain of the first differential amplifier, which is dependent on the current flowing in the differential amplifier, is controlled by the current flowing in one path of the second differential amplifier, the latter current being dependent on the drive signal. The current mirror configuration and a current source delivering the input current of the first differential amplifier operate as a multiplier in this embodiment.

Other features which are considered as characteristic for the invention are set forth in the appended claims.

Although the invention is illustrated and described herein as embodied in a circuit configuration for driving a pulse width modulator in a switched mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3 and 4 are circuit diagrams of further embodiments of the difference formation stage according to the invention.

DESCRIPTION OF THE PREFERRED EMBODIMENTS

Figure 1:
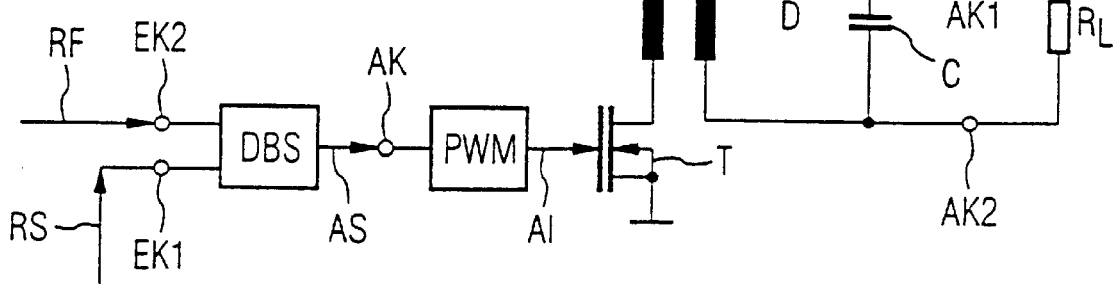
FIG. 1 is a simplified circuit diagram of a switched mode power supply having a difference formation stage, a pulse width modulator, and a semiconductor power switch.

Referring now to the figures of the drawings in detail and first, particularly, to FIG. 1 thereof, there is shown a basic illustration of a switched mode power supply using the circuit configuration according to the invention for driving a pulse width modulator PWM. Unless indicated otherwise, identical reference symbols in the figures denote identical parts having the same meaning. Connected to output terminals AK1, AK2 of the switched mode power supply is a variable load $R_L$, where the output voltage $U_A$ dropping across the load $R_L$ is intended to be kept constant. The power consumed by the switched mode power supply and passed to the load $R_L$ is determined on the basis of the duration and frequency of drive pulses AI produced by a pulse width modulator PWM for driving a semiconductor power switch T connected in series with a primary winding of a transformer U. Throughout the duration of the drive pulses AI, power is consumed by the primary winding and is then output to the load $R_L$ via a secondary winding and a rectifier configuration D, C. The frequency and/or duration of the drive pulses AI is produced in the pulse width modulator PWM on the basis of a drive signal AS which is applied to an input terminal of the pulse width modulator PWM and is formed by the difference formation stage DBS. In the case of switched mode power supplies with a fixed clock, the drive pulses AI are produced at constant time intervals, the duration of the individual drive pulses AI depending on the amplitude of the drive signal AS applied to the input of the pulse width modulator PWM.

A control signal RS which is dependent on the output voltage $U_A$ is applied to a first input terminal EK1 of the difference formation stage DBS, and a reference signal RF is applied to a second input terminal EK2. The difference formation stage DBS acts as a controller by readjusting the drive signal AS in the event of fluctuations in the output voltage $U_A$, and hence in the control signal RS, until the desired value is established for the output voltage $U_A$ and the control signal RS. The control signal RS can be produced, for example, through the use of a voltage divider on the load $R_L$ or through the use of an inductor which is inductively coupled to the primary winding and has a rectifier configuration connected downstream.

Figure 2:
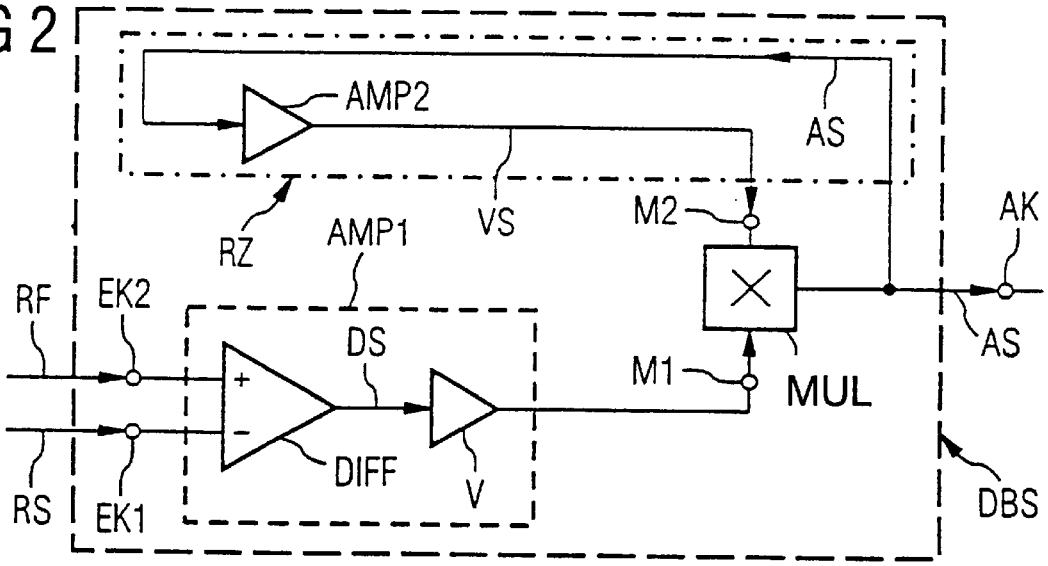
FIG. 2 is circuit diagram of the difference formation stage according to the invention.

FIG. 2 shows an inventive embodiment of the difference formation stage DBS, which can be used for stable, noise-free operation of the switched mode power supply even for very small loads $R_L$. The difference formation stage DBS has a differentiator DIFF for producing a difference signal DS from the control signal RS and the reference signal RF, the differentiator being connected to the input terminals EK1, EK2 and having a first amplifier V connected downstream for amplifying the difference signal DS. The amplified difference signal is supplied via a first input terminal M1 to a multiplier MUL which has a further input terminal M2 to which a feedback path RZ for feeding back the drive signal AS is connected. Connected in the feedback path RZ is a second amplifier AMP2, which delivers an output signal VS (which is dependent on the drive signal AS) for weighting the amplified difference signal applied to the first input terminal M1 of the multiplier MUL. The drive signal AS results from multiplication of the output signal VS from the second amplifier AMP2 and the amplified difference signal and can be tapped off at an output terminal of the multiplier MUL, the output terminal being connected to the output terminal AK of the difference formation stage DBS.

Figure 5:
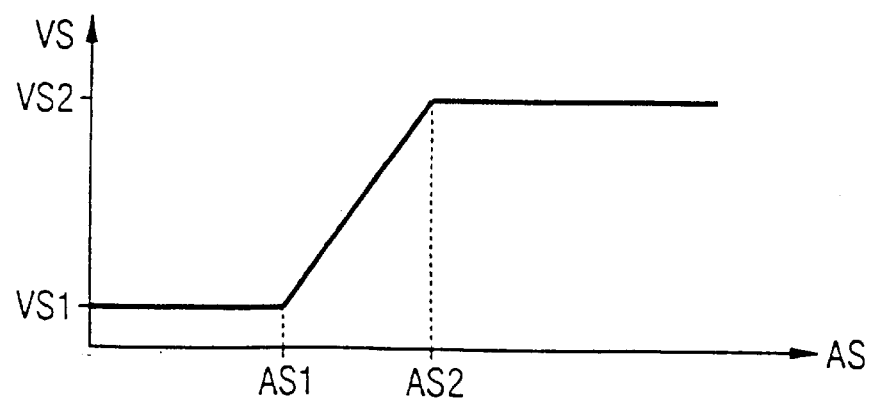
FIG. 5 is a graph illustrating an output characteristic curve for the amplifier in the circuit configuration shown in FIG. 2.

FIG. 5 shows an output characteristic curve for the second amplifier AMP2, which operates on a linear basis in the illustrative embodiment, as a function of the drive signal AS applied to an input of the second amplifier AMP2. The amplifier AMP2 causes a linear gain in the drive signal AS when the drive signal AS assumes values between a lower limit value AS1 and an upper limit value AS2. Below this limit value AS1, the amplifier AMP2 delivers a first constant output signal VS1; above the upper limit value AS2, the amplifier AMP2 delivers a second constant output signal VS2. If the first amplifier V, which is connected downstream of the differentiator DIFF, causes a gain in the difference signal DS by a factor k1, then a gain factor k results for the difference formation stage DBS of k1·VS1 for AS<AS1 and k1·VS2 for AS>AS2 with a linear rise in the gain factor from k1·VS1 to k1·VS2 for values of the drive signal AS between AS1 and AS2.

The inventive circuit configuration for driving the pulse width modulator PWM causes a reduction in the total gain factor k for small values of the drive signal AS. Small values of the drive signal AS produce drive pulses AI of very short duration, as a result of which the semiconductor power switch T, which is preferably in the form of a power FET, is no longer fully on, but rather changes to the active range. The very high gain of the power FET T in the active range is at least partly compensated for by reducing the gain factor k of the difference formation stage DES, which means that the switched mode power supply is operated stably even when the power FET is in the active range.

Figure 4:
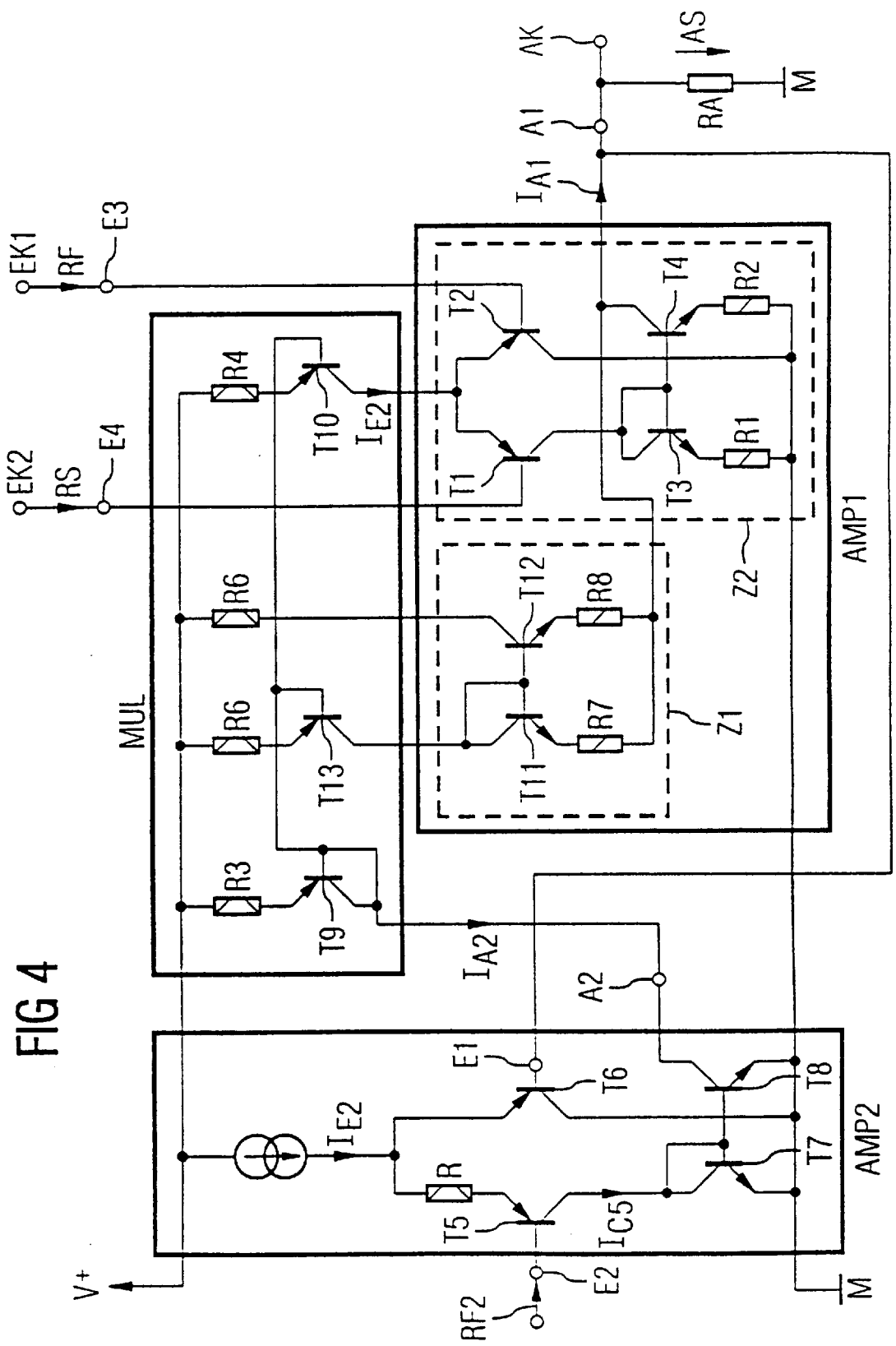

FIGS. 3 and 4 are circuit diagrams of exemplary embodiments illustrating how a difference formation stage DES as shown in FIG. 2 is configured.

The second amplifier AMP2 is in the form of a differential amplifier and is connected between a supply potential V+ and reference-ground potential M. The differential amplifier has a current source which is connected to supply potential V+ and delivers a constant input current $I_{E2}$, and a parallel circuit, connected downstream of the current source, including a first and a second transistor T5, T6, with a resistor R being connected in series with the load path of the first transistor T5. The base connections of the transistors T5, T6 form first and second inputs E1, E2 of the differential amplifier, a second reference signal RF2 being applied to the base connection of the transistor T5 and the drive signal AS fed back from the output being applied to the base connection of the second transistor T6.

The collector current $I_{C5}$ of the first transistor T5 is maximum (equal to $I_{E2}$) when the drive signal AS, in the present case the voltage across an output resistor RA, is greater than RF2+I·R. Below this limit value for the drive signal AS, the collector current $I_{C5}$ falls continuously in line with the equation:

$$I_{C5}=(AS-RF2)/R.$$

The collector current $I_{C5}$ of the first transistor T5 determines, via a current mirror configuration T7, T8, an output current $I_{A2}$ from the second differential amplifier AMP2 which can be tapped off at an output terminal, the output current $I_{A2}$ being related to the collector current $I_{C5}$ of the first transistor T5 via the aspect ratio or area ratio of the two transistors T7, T8 forming the current mirror. This output current $I_{A2}$ determines, via a further current mirror R3, T9, R4, T10, an input current $I_{E1}$ for a first differential amplifier AMP1, the latter performing the function of the differentiator DIFF and of the first amplifier V shown in FIG. 2. The base connections of a first and a second transistor T1, T2 in the differential amplifier form first and second inputs E3, E4 of the first differential amplifier and are connected to the first and second input terminals EK1, EK2. Connected downstream of the first and second transistors T1, T2 is a further current mirror configuration T3, R1, T4, R2, as a load. An output current $I_{A1}$ from the first differential amplifier AMP1 which can be tapped off at an output terminal A1 results from the difference between the collector current $I_{C2}$ of the second transistor T2 in the differential amplifier and the collector current $I_{C4}$ of the current mirror transistor T4 connected downstream of the second transistor T2.

The output current $I_{A1}$ from the first differential amplifier AMP1 is dependent on the difference between the control signal RS and the reference signal RF, the output current $I_{A1}$ being at most equal to the input current $I_{E1}$, which is in turn proportional to the output current $I_{A2}$ from the second differential amplifier AMP2. The gain of the differential amplifier AMP1 is therefore controlled through the use of the output current $I_{A2}$ from the second differential amplifier AMP2 on the basis of the drive signal AS, a twofold increase in the output current $I_{A2}$ from the second differential amplifier AMP2 causing a twofold increase in the gain of the differential amplifier AMP1, for example. The current mirror R3, T9, R4, T10, which reproduces the output current $I_{A2}$ from the second differential amplifier on the input current $I_{E1}$ of the first differential amplifier AMP1, assumes the function of a multiplier MUL in this case. Connected between the collector of the second transistor T2 in the first differential amplifier AMP1 and reference-ground potential M is an output resistor $R_A$ which has the output signal AS across it. When an output resistor $R_A$ is used, the difference formation stage has a proportional control response; an integral control response could be achieved by replacing the output resistor $R_A$ with a capacitor.

FIG. 4 shows a further embodiment of the difference formation stage DBS according to the invention, in which the differential amplifier AMP1 additionally has a current source which is connected to the output, is connected up as a current mirror T11, T12, R7, R8 and delivers to an output A1 a current which is dependent on the output current $I_{A2}$ from the second differential amplifier AMP2. To this end, the current source T11, T12, R7, R8 is connected via a transistor T13 and a resistor R6 to the current mirror configuration R3, T9, R4, T10 between the differential amplifier AMP2 and the differential amplifier AMP1. The collector of the second transistor T2 in the differential amplifier AMP1 is connected directly to reference-ground potential M in this embodiment. The effect achieved by this is that the current mirror T3, T4, R1, R2, which serves as a load for the differential amplifier, delivers no current to the output, but rather can pick up only a current which is dependent on the input current $I_E$ and the difference between the control signal RS and the reference signal RF. The output current $I_{A2}$ results from the difference between the current delivered by the current source T11, T12, R7, R8 and the current picked up by the current mirror T3, T4, R1, R2. In this embodiment, the differential amplifier AMP1 exhibits the response of an amplifier with a current offset at the output.

In the illustrative embodiments described, the first and second differential amplifiers AMP1, AMP2 operate as controlled current sources, where the output current $I_{A2}$ from the second differential amplifier AMP2, which serves as a second controlled current source, determines the maximum input current $I_{E1}$, and hence the maximum output current $I_{A1}$, of the first differential amplifier AMP1, which serves as a first controlled current source. If the output current $I_{A2}$ from the second differential amplifier AMP2 is reduced as a result of a falling drive signal AS, then, with a constant ratio between the control signal RS and the reference signal RF, the output current $I_{A1}$ from the second differential amplifier, the gain of the first differential amplifier AMP1, and hence the gain factor k of the difference formation stage DBS, are also reduced as the drive signal becomes smaller. The two controlled current sources are coupled through the use of a current mirror configuration T9, R3, T10, R4; T9, R3, T10, R4, T13, R6. In the present illustrative embodiments, the drive signal AS results from the voltage drop caused by the output current $I_{A1}$ on a resistor RA connected to the output A1 of the first differential amplifier AMP1.

In FIGS. 4 and 5, the reference symbols T1, T2, T5, T6, T9, T10 and T13 denote pnp bipolar transistors, and the reference symbols T3, T4, T7, T8, T11, T12 denote npn bipolar transistors. The reference symbols R1 to R8 denote resistors.

I claim:

1. A circuit configuration for driving a pulse width modulator in a switched mode power supply, comprising:

a difference formation stage having a first input terminal for receiving a control signal, a second input terminal for receiving a reference signal, and an output terminal for providing a drive signal;

said difference formation stage forming a difference signal from the control signal and the reference signal, and amplifying the difference signal by a gain factor dependent on at least one of the drive signal and the control signal for providing an amplified difference signal;

said difference formation stage including a multiplier and a feedback path;

said multiplier including a multiplier output connected to said output terminal, a first multiplier input terminal for receiving the amplified difference signal, and a second multiplier input terminal;

said feedback path having an output connected to said second multiplier input terminal and including an amplifier having a gain range extending between a top limit and at a bottom limit; and said amplifier producing, based on the drive signal fed back into said feedback path via said multiplier output, a first constant output signal if the drive signal has a value below a first limit value, and said amplifier producing a second constant output signal if the drive signal has a value above a second limit value.

2. The circuit configuration according to claim 1, wherein said difference formation stage includes a differentiator connected upstream of said first multiplier input terminal for forming the difference signal, said differentiator has differentiator inputs connected to said first and second input terminals, and said difference formation stage further includes a further amplifier connected downstream of said differentiator.

3. The circuit configuration according to claim 2, wherein said differentiator and said further amplifier together form a differential amplifier.

4. The circuit configuration according to claim 3, wherein:

said differential amplifier is a first differential amplifier receiving an input current;

said amplifier in said feedback path is configured as a second differential amplifier having a first amplifier input terminal for receiving the drive signal, a second amplifier input terminal for receiving a further reference signal, and an amplifier output terminal for supplying an output current dependent on the drive signal and on the further reference signal; and said difference formation stage further includes a current mirror configuration controlling the input current of said first differential amplifier in dependence of the output current from said second differential amplifier.

5. The circuit configuration according to claim 1, wherein said amplifier in said feedback path is configured as a linearly operating amplifier producing, for values of the drive signal above the first limit value and below the second limit value, an output signal rising linearly with an increasing value of the drive signal.

6. A circuit configuration for driving a pulse width modulator in a switched mode power supply, comprising:

a difference formation stage having a first input terminal for receiving a control signal, a second input terminal for receiving a reference signal, and an output terminal for providing a drive signal;

said difference formation stage forming a difference signal from the control signal and the reference signal, and amplifying the difference signal by a gain factor dependent on at least one of the drive signal and the control signal;

said difference formation stage including a first controlled current source and a second controlled current source, said second controlled current source including an input terminal and an output terminal;

said second controlled current source supplying at said output terminal a second output current dependent on the drive signal applied to said input terminal of said second controlled current source, said second controlled current source respectively delivering one of a first and a second constant value of the second output current if the drive signal has one of a value below a first limit value and a value above a second limit value; and said first controlled current source being connected to said output terminal of said second controlled current source, said first controlled current source having a first input terminal for receiving the reference signal and a second input terminal for receiving the control signal, said first controlled current source delivering, to an output terminal thereof, a first output current corresponding to the drive signal and dependent on the difference signal and further dependent on the second output current.

7. The circuit configuration according to claim 6, wherein said difference formation stage includes a current mirror configuration connected between said first and said second controlled current sources.

* * * * *